United States Patent [19]

Imanaka et al.

[11] 4,351,044
[45] Sep. 21, 1982

[54] RECORDING SYSTEM USING DISK-SHAPED RECORDING MEDIUM

[75] Inventors: Ryoichi Imanaka; Seizou Tsuji, both of Hirakata, Japan

[73] Assignee: Matsushita Electric Industrial Co., Ltd., Osaka, Japan

[21] Appl. No.: 109,493

[22] Filed: Jan. 4, 1980

[30] Foreign Application Priority Data

Jan. 9, 1979 [JP] Japan .................................... 54-1202
Oct. 23, 1979 [JP] Japan ................................ 54-137481

[51] Int. Cl.$^3$ ............................................ G11B 17/00
[52] U.S. Cl. ...................................... 369/43; 369/51; 360/73; 360/77; 360/86
[58] Field of Search ................................... 369/43–44, 369/47, 50–51, 111, 132–133, 221, 239–240; 360/86, 70, 71, 73, 75, 77–78

[56] References Cited

U.S. PATENT DOCUMENTS 3,646,259 2/1972 Schuller ................................ 369/47
3,662,353 5/1972 Chertok ............................... 369/133
3,939,302 2/1976 Kihara .................................. 369/240
3,980,818 9/1976 Browning ............................ 369/240

FOREIGN PATENT DOCUMENTS 52-40308 3/1977 Japan ..................................... 369/43

Primary Examiner—Raymond F. Cardillo, Jr.
Attorney, Agent, or Firm—Burgess, Ryan and Wayne

[57] ABSTRACT

A recording system of the type wherein the information is recorded on a spiral track on a disk-shaped recording medium, which is rotated by a signal transducer which is moved radially with respect to the recording medium. Both the rotational speed or angular velocity of the recording medium and the velocity of the radial movement of the signal transducer are so controlled, in response to the radial position of the signal transducer or the time elapsed after the recording was started, that the relative velocity of the signal transducer with respect to the recording medium may be always maintained constant.

3 Claims, 4 Drawing Figures

RECORDING SYSTEM USING DISK-SHAPED RECORDING MEDIUM

BACKGROUND OF THE INVENTION

The present invention relates to an improvement of a recording system of the type wherein the information is recorded on a spiral track on a disk-shaped recording medium, which is rotated, by a signal transducer which is moved radially with respect to the recording medium.

In the conventional recording systems of the type described, the disk-shaped recording medium is rotated in general at a constant angular velocity so that the relative linear velocity between the recording medium and the signal transducer varies widely as the signal transducer moves radially inwardly or outwardly. As a result, the recording and reproducing characteristics are adversely affected at the radially inward portion where the relative linear velocity becomes lower.

SUMMARY OF THE INVENTION

In view of the above, the present invention has for its primary object to provide a disk-shaped recording medium of a recording system wherein the relative linear velocity between a disk-shaped recording medium and a signal transducer may be maintained always constant, whereby the recording density may be drastically improved.

To the above and other objects, according to the present invention, in response to the electrical signal representative of the radial position of the signal transducer relative to the disk-shaped recording medium, both the angular velocity of the disk-shaped recording medium and the velocity of the radial movement of the signal transducer are so controlled that the relative velocity between the disk-shaped recording medium and the signal transducer may be always maintained constant at any radial position.

BRIEF DESCRIPTION OF THE DRAWINGS

Same reference numerals are used to designate similar parts throughout the figures.

DESCRIPTION OF THE PREFERRED EMBODIMENTS

Figure 1:
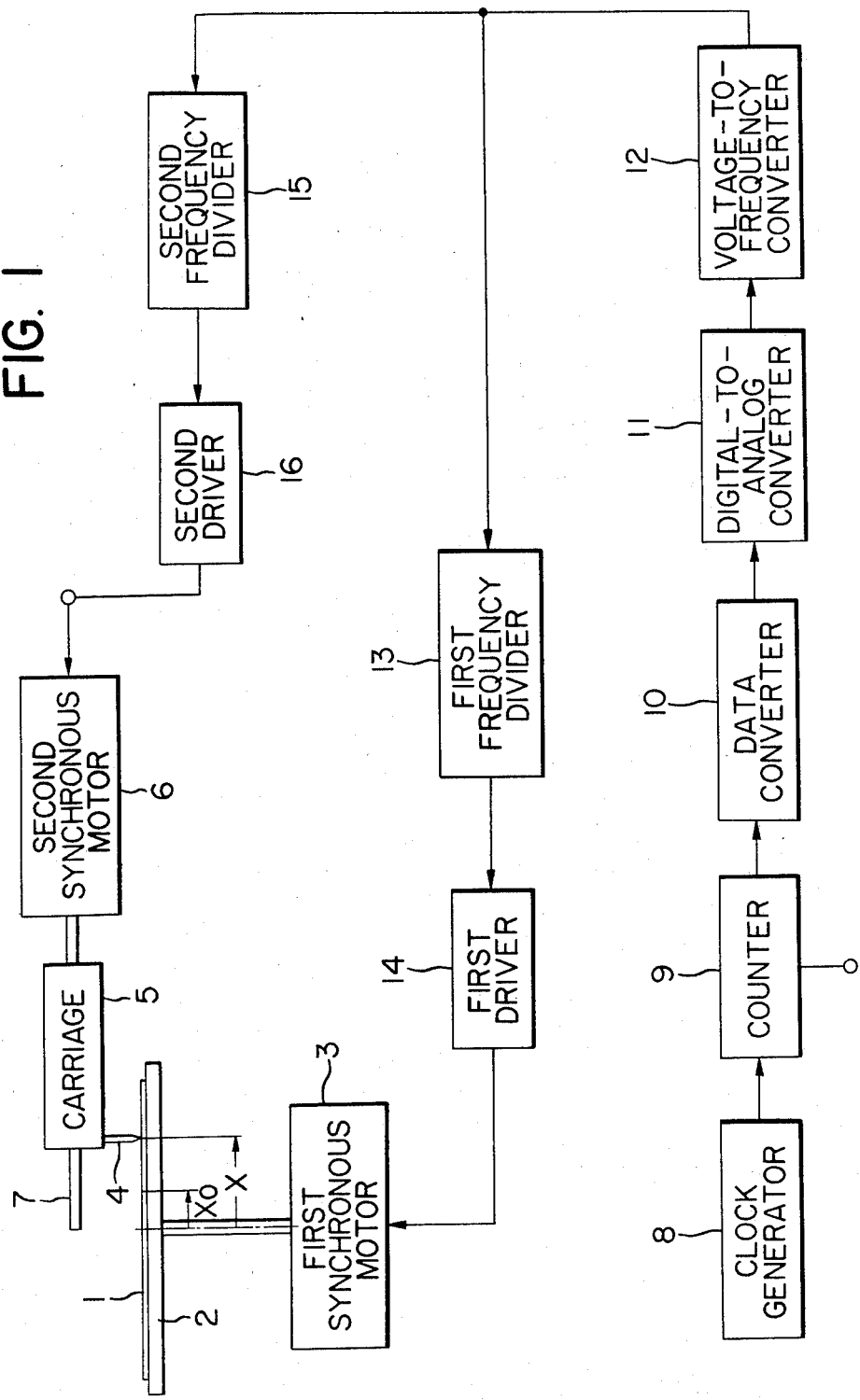
FIG. 1 is a block diagram of a first embodiment of the present invention.

First Embodiment, FIGS. 1 and 2

Referring to FIG. 1, a disk-shaped recording medium 1 to be referred to as "the disk" for the brevity hereinafter in this specification is placed on a turntable 2 which is driven by a first synchronous motor 3. A signal transducer 4 to be referred to as "the head" for brevity hereinafter in this specification is carried by a carriage 5 threadably engaged with a lead screw 7 which in turn is driven by a second synchronous motor 6 so that the head 4 may be moved radially relative to the disk 1.

In order that the relative velocity V between the disk 1 and the head 4 may be maintained constant, the following equations (A) and (B) must be satisfied:

$$\omega(t) = \frac{V}{\sqrt{\left(x_0^2 + \frac{P \cdot V}{\pi} \cdot t\right)}} \quad (A)$$

and $$\omega(t) = V/x \quad (B)$$

where
- $\omega(t)$ is the angular velocity of the first synchronous motor 3 at time t;
- $x_0$ is the distance from the center of the disk 1 to the head 4 when recording is started;
- t is the time interval elapsed after the recording has been started, t being zero at $x_0$;
- P is the pitch between the tracks on the disk 1; and
- x is the distance from the center of the disk 1 to the head 4 at time t.

From the relation $$\omega(t) \cdot x = V$$

Eq. (B) is obtained.
From the relation $$\pi x^2 - \pi x_0^2 = P \cdot V \cdot t$$

x is obtained. Substituting x into Eq. (B), Eq. (A) is obtained. Eq. (A) and (B) are plotted in FIG. 2.

Figure 2A:
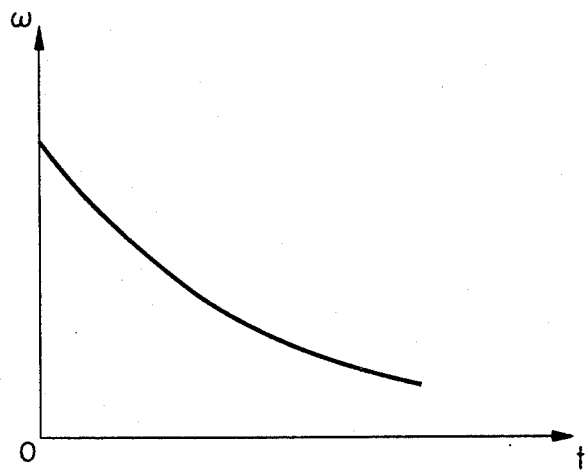
FIG. 2A and FIG. 2B show the curves of formulas A and B respectively used for the explanation of the mode of operation thereof.

Referring back to FIG. 1, a clock generator 8 generates clock pulses of a predetermined frequency which are delivered to a counter 9 which in turn starts counting the input pulses in response to the start signal applied to a terminal 20 when the recording is started (t=0 and x=$x_0$). The output pulses from the counter 9 are delivered to a data converter or programmed logic array unit 10 which consists of one or more read-only memories and is adapted to generate the output representative of $\omega(t)$ of Eq. (A) in response to the input representative of time t as shown in FIG. 2A, where the time, which is the output from the data counter 9, is plotted along the abscissa while the output $\omega(t)$ of the data converter 10, along the ordinate.

The output from the data converter 10 is converted by a digital-to-analog converter 11 into a direct current which in turn is converted by a voltage-to-frequency converter 12 into the frequency signal proportional to the output from the data converter 10. The output from the converter 12 is applied to both first and second frequency dividers 13 and 15. In response to the frequency output signal from the first frequency divider 13, the rotational speed of the first synchronous motor 3 is controlled by a first driver 14 so that $\omega(t)$ is gradually decreased with time t in accordance with Eq. (A) and as indicated in FIG. 2A.

The output from the voltage-to-frequency converter 12 is also applied through the second frequency divider 15 and a second driver 16 to the second synchronous motor 6 so that the rotational speed of the latter is also decreased with time.

Therefore when the frequency division ratios of both the first and second frequency dividers 13 and 15 are suitably selected, the rotational speed of the disk 1 and the velocity of the head 4, which moves radially outwardly, are gradually varied depending upon the position x of the head 4 from the center of the disk 1 in such a way that the relative velocity V between the disk 1 and the head 4 may be maintained constant and the information may be recorded on a spiral locus or track of a constant pitch.

When the signal to be recorded contains the synchronous signal as with the case of the video signal, the synchronous signal is so recorded on the disk that it has the same spatial period. Therefore in the reproduction of the recorded signal, the rotational speed of the disk 1 is so controlled that the frequency of the synchronous signal may have a predetermined value.

In the first embodiment, the clock generator 8 is used to generate the clock or the pulses of a predetermined frequency in order to control the rotational speeds of both the first and second synchronous motors 3 and 6, but it is to be understood that a linear encoder which generates the pulse representative of the position x of the head 4 may be used so as to control the rotational speeds of the first and second synchronous motors 3 and 6 according to Eq. (B).

Figure 3:
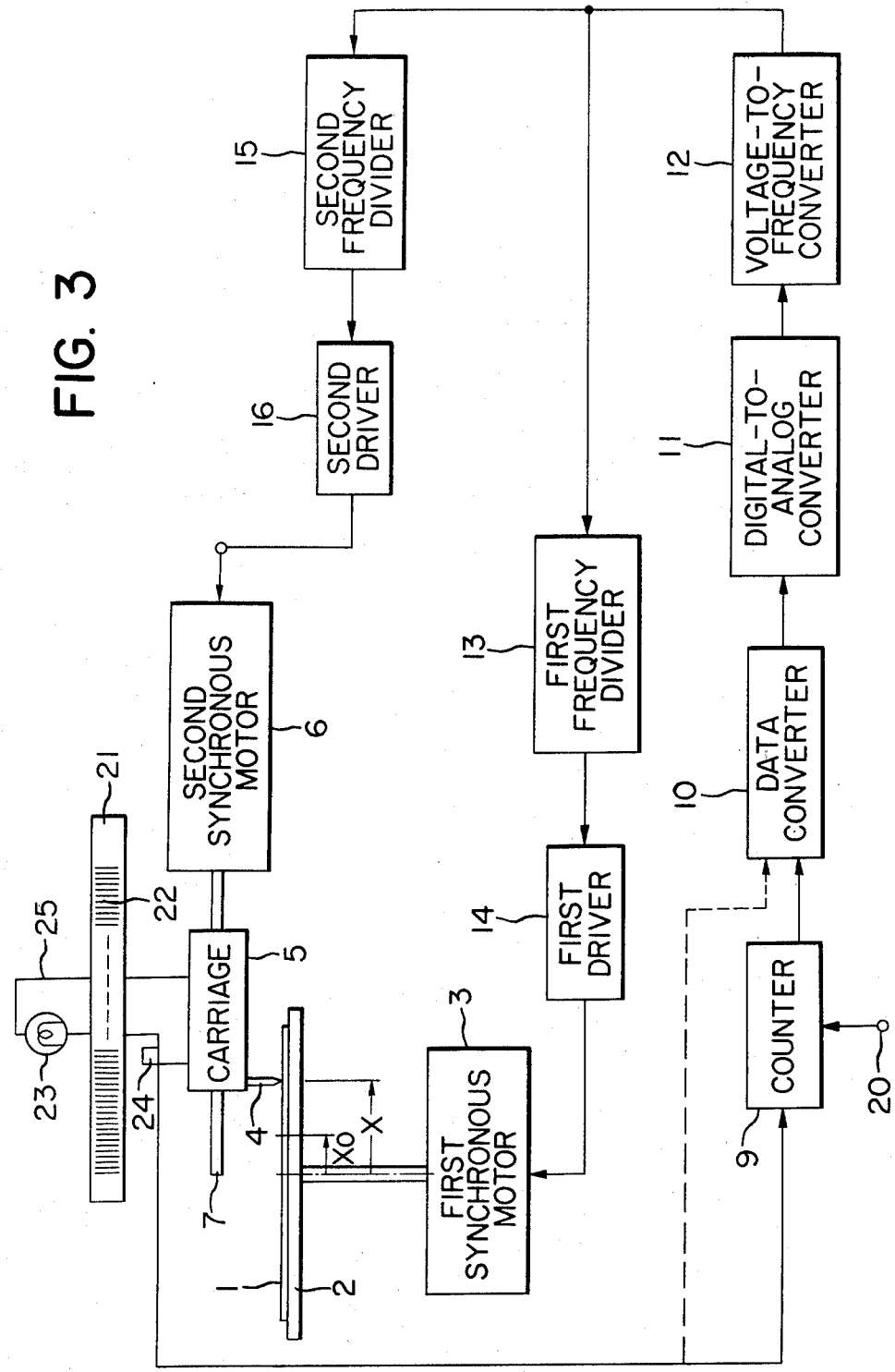
FIG. 3 is a block diagram of a second embodiment of the present invention.

Second Embodiment, FIG. 3

Figure 2B:
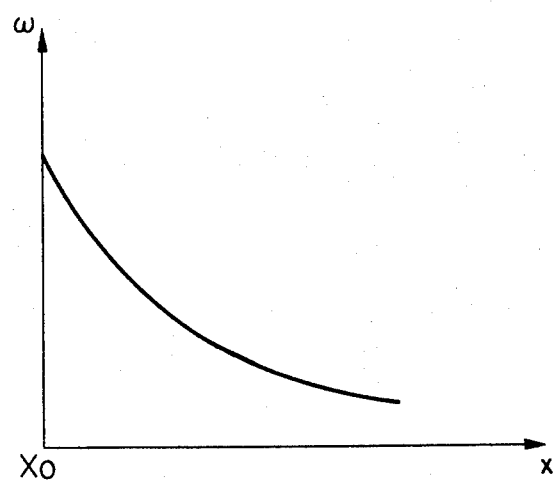

The second embodiment shown in FIG. 3 is substantially similar in construction to the first embodiment shown in FIG. 1 except that instead of the clock generator 8 a pulse generator to be described below is added. That is, a slit plate 21 formed with a plurality of equidistantly spaced slits 22 is disposed in parallel with the lead screw 7. A light emitting element 23 and a light sensor 24 are mounted on a support 25, which in turn is mounted on the carriage 5, in such a way that the light beam emitted from the light emitting element 23 may be intercepted through one of the slits 22 on the light sensor 24. Therefore as the head 4 or the carriage 5 moves radially, the light sensor 25 generates the pulses sequentially which in turn are applied in the counter 9. In the second embodiment, the data converter 10 is so logically arranged that its input-output characteristic may satisfy Eq. (B) as shown in FIG. 2B.

It is to be understood that various modifications of the second embodiment may be effected. For instance, the slits 22 of the slit plate 21 may be so calibrated as to directly indicate the position of the head 4 so that the output of the light sensor 24 representative of the position of the head 4 may be directly applied to the data converter 10. With this modification, it is possible to start the recording at any position.

In both the first and second embodiments, the output of the counter 9 is applied to the data converter 10 which in turn generates the output satisfying Eq. (A) or Eq. (B). Alternatively, a variable frequency divider may be inserted between the clock generator 8 and the counter 9 so that the characteristic curve shown in FIG. 2A or 2B may be approximated by line segments. Furthermore, it is possible to employ an operational amplifier or to control the DC voltage derived from the digital-to-analog converter 11.

So far the head 4 has been described as being moved radially outwardly relative to the disk 1, but it is to be understood that the head 4 may be moved radially inwardly. In the latter case, the following equations must be satisfied:

$$\omega(t) = \frac{V}{\sqrt{\left(x_0^2 - \frac{P \cdot V}{\pi} \cdot t\right)}} \quad (A')$$

$$\omega(t) = V/x \quad (B')$$

In sum, according to the present invention, the rotational speed of the disk 1 and the velocity of the head 4 which moves radially inwardly or outwardly relative to the disk 1 may be controlled electrically so that even though the control system is very simple in construction, both the disk 1 and the head 4 may be controlled with a higher degree of accuracy. In addition, the relative velocity between the disk 1 and the head 4 may be maintained always constant at any point.

What is claimed is:

1. A recording system of the type in which a disk-shaped recording medium is rotated by a first driver means at an angular speed corresponding to the frequency of a first drive signal applied thereto, and inscribed with a helical recording path bearing the signal by means of a recording head which is gradually displaced in the radial direction by a second driver means, comprising:

a frequency generating means for producing output pulses at a normally constant frequency;

a counter means for starting counting of the output pulses from said frequency generating means from the time when said recording head has started the recording of a signal on said recording medium, and for generating a digital output representative of the result of the counting;

a data converter for processing the output from said counter means to generate a digital signal in a predetermined format;

a digital-to-analog converter for converting the digital output from said data converter into a DC voltage;

a voltage-to-frequency converter for generating an AC signal having a frequency corresponding to the output from said digital-to-analog converter;

first frequency divider means for frequency dividing the output from said voltage-to-frequency converter to provide a first drive signal, and for delivering said first drive signal to said first driver means to rotate said recording medium; and second frequency divider means for frequency dividing the output from said voltage-to-frequency converter to provide a second drive signal, and for delivering said second drive signal to said second driver means to drive said recording head in the radial direction, whereby synchronized operation of said first and second driver means is provided.

2. A recording system as set forth in claim 1, wherein said recording head includes:

a velocity detection means for generating a pulse each time said recording head has shifted by a predetermined distance in the radial direction;

said counter means counting the pulses from said velocity detection means from the time when the recording has been started and producing a digital output representative of the result of the counting.

3. A recording system as set forth in claim 1, wherein said frequency generating means comprises a radial position detection means for detecting the radial position of said recording head on said recording medium and delivering a digital output corresponding thereto.

* * * * *